United States Patent
Sako

(10) Patent No.: US 10,338,856 B2
(45) Date of Patent: Jul. 2, 2019

(54) IMAGE FORMING APPARATUS HAVING NEAR-FIELD WIRELESS COMMUNICATION FUNCTION, CONTROL METHOD THEREFOR, AND STORAGE MEDIUM

(71) Applicant: CANON KABUSHIKI KAISHA, Tokyo (JP)

(72) Inventor: Ritsuto Sako, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/827,818

(22) Filed: Aug. 17, 2015

(65) Prior Publication Data
US 2016/0054957 A1 Feb. 25, 2016

(30) Foreign Application Priority Data
Aug. 21, 2014 (JP) .................................. 2014-168365

(51) Int. Cl.
*G06F 3/12* (2006.01)
*H04W 4/80* (2018.01)

(52) U.S. Cl.
CPC .......... *G06F 3/1205* (2013.01); *G06F 3/1263* (2013.01); *G06F 3/1287* (2013.01); *G06F 3/1292* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 9,106,781 B2 | 8/2015 | Suzuki et al. | |
| 2007/0019616 A1* | 1/2007 | Rantapuska | H04L 12/1822 370/352 |
| 2007/0070401 A1* | 3/2007 | Okamoto | G06F 3/1222 358/1.15 |

(Continued)

FOREIGN PATENT DOCUMENTS

| | | |
|---|---|---|
| JP | 2009055580 A | 3/2009 |
| JP | 2013214139 A | 10/2013 |

(Continued)

OTHER PUBLICATIONS

Search Report issued in Singapore Appln. No. 10201506457W dated Apr. 19, 2016.

(Continued)

*Primary Examiner* — Fan Zhang
(74) *Attorney, Agent, or Firm* — Rossi, Kimms & McDowell LLP

(57) ABSTRACT

An image forming apparatus which does not reserve a print job when a user is supposedly close to the image forming apparatus so that convenience for the user can be improved. Data that is to be sent to an external apparatus and includes identification information is generated and written in a near-field wireless communication unit which the image forming apparatus has. When the image forming apparatus receives a print request, it is judged whether or not the identification information is included in the print request. When it is judged that the identification information is not included in the print request, the image forming apparatus is controlled to carry out a printing process without reserving a print job corresponding to the print request.

12 Claims, 11 Drawing Sheets

(56) References Cited

U.S. PATENT DOCUMENTS

| | | | |
|---|---|---|---|
| 2007/0091360 A1* | 4/2007 | Iizuka | G06F 3/1222 358/1.15 |
| 2009/0039147 A1 | 2/2009 | Yamamoto et al. | |
| 2010/0238493 A1 | 9/2010 | Sako et al. | |
| 2011/0078769 A1* | 3/2011 | Tsubaki | G06F 17/30067 726/4 |
| 2013/0003106 A1* | 1/2013 | Nishida | G06F 3/1222 358/1.14 |
| 2013/0016388 A1* | 1/2013 | Amano | G06F 3/1204 358/1.14 |
| 2013/0070297 A1* | 3/2013 | Kato | H04N 1/00217 358/1.15 |
| 2013/0094047 A1 | 4/2013 | Bailey et al. | |
| 2013/0194623 A1* | 8/2013 | Tecu | G06F 3/1204 358/1.15 |
| 2013/0258408 A1 | 10/2013 | Mizutani | |
| 2014/0019759 A1* | 1/2014 | Burmester | H04L 63/08 713/172 |
| 2014/0092413 A1* | 4/2014 | Shibata | H04N 1/00204 358/1.13 |
| 2014/0094117 A1 | 4/2014 | Rajendran et al. | |
| 2014/0096202 A1* | 4/2014 | Matsuda | H04W 4/008 726/4 |
| 2014/0168687 A1 | 6/2014 | Kim et al. | |
| 2015/0277823 A1* | 10/2015 | Nakayama | G03G 15/5087 358/1.14 |
| 2016/0011835 A1* | 1/2016 | Igarashi | G06F 3/1237 358/1.15 |

FOREIGN PATENT DOCUMENTS

| | | | |
|---|---|---|---|
| JP | 2014082756 A | | 5/2014 |
| KR | 20070067422 A | * | 6/2007 |
| WO | 2012118045 A1 | | 9/2012 |

OTHER PUBLICATIONS

Office Action issued in Japanese Application No. 2014-168365 dated Apr. 10, 2018.

* cited by examiner

IMAGE FORMING APPARATUS HAVING NEAR-FIELD WIRELESS COMMUNICATION FUNCTION, CONTROL METHOD THEREFOR, AND STORAGE MEDIUM

BACKGROUND OF THE INVENTION

Field of the Invention

The present invention relates to an image forming apparatus, a control method therefor, and a storage medium, and in particular to an image forming apparatus which performs predetermined information processing in response to an access made using wireless communication such as NFC (near-field communication).

Description of the Related Art

In recent years, image forming apparatuses having various wireless communication functions have come on the market. For example, image forming apparatuses equipped with NFC, wireless LAN, Bluetooth (registered trademark), or the like are known. There is a method of causing an image forming apparatus to perform printing using a communication terminal such as a smartphone which supports NFC (Japanese Laid-Open Patent Publication (Kokai) No. 2013-214139).

According to Japanese Laid-Open Patent Publication (Kokai) No. 2013-214139, upon detecting the communication terminal coming within an NFC communication zone, the image forming apparatus establishes NFC communication and exchanges information so as to shift into a high-speed network communication using a wireless LAN or Bluetooth (registered trademark). According to the exchanged information, the image forming apparatus then establishes high-speed communication with the communication terminal and receives print data (that is, a print job) from the communication terminal using a printing protocol such as the IPP (Internet Printing Protocol) and carries out a printing process.

To perform printing with ease using this image forming apparatus, it is necessary to set required information in an NFC module, which the image forming apparatus has, as NDEF (NFC Data Exchange Format) data in advance.

NDEF information is comprised of a plurality of NDEF records, and for example, device identifying information for uniquely identifying the image forming apparatus from the communication terminal and connecting information for establishing connection using Bluetooth (registered trademark) are stored as the NDEF records. NDEF data and NDEF records constituting the NDEF data vary with functions performed by the NFC module.

For example, when a predetermined application is desired to be automatically started on the communication terminal side, an NDEF record for calling this application is stored as NDEF data. It should be noted that NDEF and details such as formats of NDEF records are defined by the NFC forum which is a standardization group.

On the other hand, in recent years, image forming apparatuses which support a so-called reservation printing function have come on the market. In reservation printing, when an image forming apparatus receives a print job, it stores the print job in a storage such as an internal hard disk without carrying out a printing process. Then, a user selects the print job stored in the storage using an operating panel of the image forming apparatus to carry out a printing process.

With this image forming apparatus, the user is allowed to execute a print job only after directly and manually operating the image forming apparatus, and hence he or she can print a document which he or she does not want anyone to see such as a classified document with a feeling of security.

With the reservation printing function described above, when a print job is sent from a place (for example, a user's own PC) away from an image forming apparatus, printing is not started until the user performs a printing operation with the image forming apparatus, and hence security is ensured.

On the other hand, when a user sends a print job from a communication terminal using near-field wireless communication such as NFC, he or she is supposed to be close to an image forming apparatus. If the reservation printing function is applied to such a case, the user is required not only to send a print job from the communication terminal but also to perform a printing operation for a reserved print job using the image forming apparatus, and this is very troublesome.

SUMMARY OF THE INVENTION

The present invention provides an image forming apparatus which does not reserve a print job when a user is supposedly close to the image forming apparatus so that convenience for the user can be improved, a control method therefor, and a storage medium.

Accordingly, the present invention provides an image forming apparatus having a reservation printing function of reserving a received print job and carrying out a printing process based on the reserved print job in accordance with an instruction from a user, comprising a near-field wireless communication unit, a generating unit configured to generate data that is to be sent to an external apparatus and includes identification information, a writing unit configured to write, in the near-field wireless communication unit, the data generated by the generating unit, a judgment unit configured to, when the image forming apparatus receives a print request, judge whether the identification information is included in the print request, and a control unit configured to, when the judgment unit judges that the identification information is not included in the print request, control the image forming apparatus such that a print job corresponding to the print request is reserved, and when the judgment unit judges that the identification information is included in the print request, control the image forming apparatus such that a printing process is carried out without reserving a print job corresponding to the print request.

According to the present invention, when a print request is received, it is judges whether or not identification information is included in the print request, and when the identification information is not included in the print request, a print job corresponding to the print request is reserved, and on the other hand, when the identification information is included in the print request, a printing process is carried out without reserving a print job corresponding to the print request. As a result, even when reservation printing is selected, a user performs printing with ease.

Further features of the present invention will become apparent from the following description of exemplary embodiments (with reference to the attached drawings).

DESCRIPTION OF THE EMBODIMENTS

A description will now be given of exemplary image forming apparatuses according to embodiments of the present invention.

Figure 1:
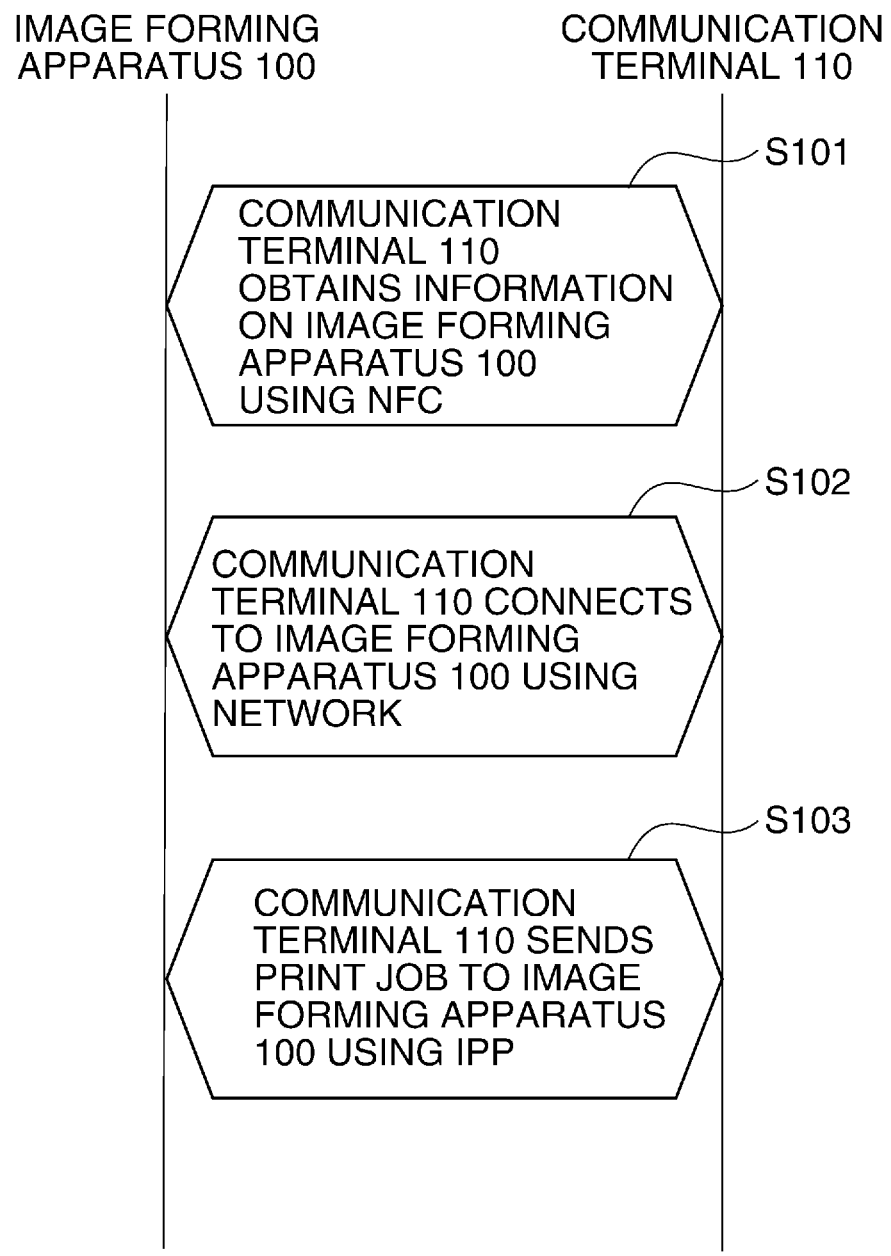
FIG. 1 is a diagram useful in explaining an NFC touch-to-print printing process which is carried out by an exemplary image forming apparatus according to a first embodiment of the present invention.

FIG. 1 is a diagram useful in explaining an NFC touch-to-print printing process which is carried out by an exemplary image forming apparatus according to a first embodiment of the present invention. It should be noted that the NFC touch-to-print printing process means simplified printing which is performed after a communication terminal 110 is touched to an NFC unit 209 (described later with reference to FIG. 2) of the image forming apparatus 100.

To carry out the NFC touch-to-print printing process, the communication terminal (terminal device) 110 such as a mobile terminal obtains information on the image forming apparatus 100 from the image forming apparatus 100 using NFC (step S101).

The communication terminal 110 then connects to the image forming apparatus 100 via a network (for example, a wireless LAN or a wired LAN) (step S102). The communication terminal 110 then sends a print request including a print job to the image forming apparatus 100 using IPP (step S103). The image forming apparatus 100 carries out a printing process in accordance with the print job.

Figure 2:
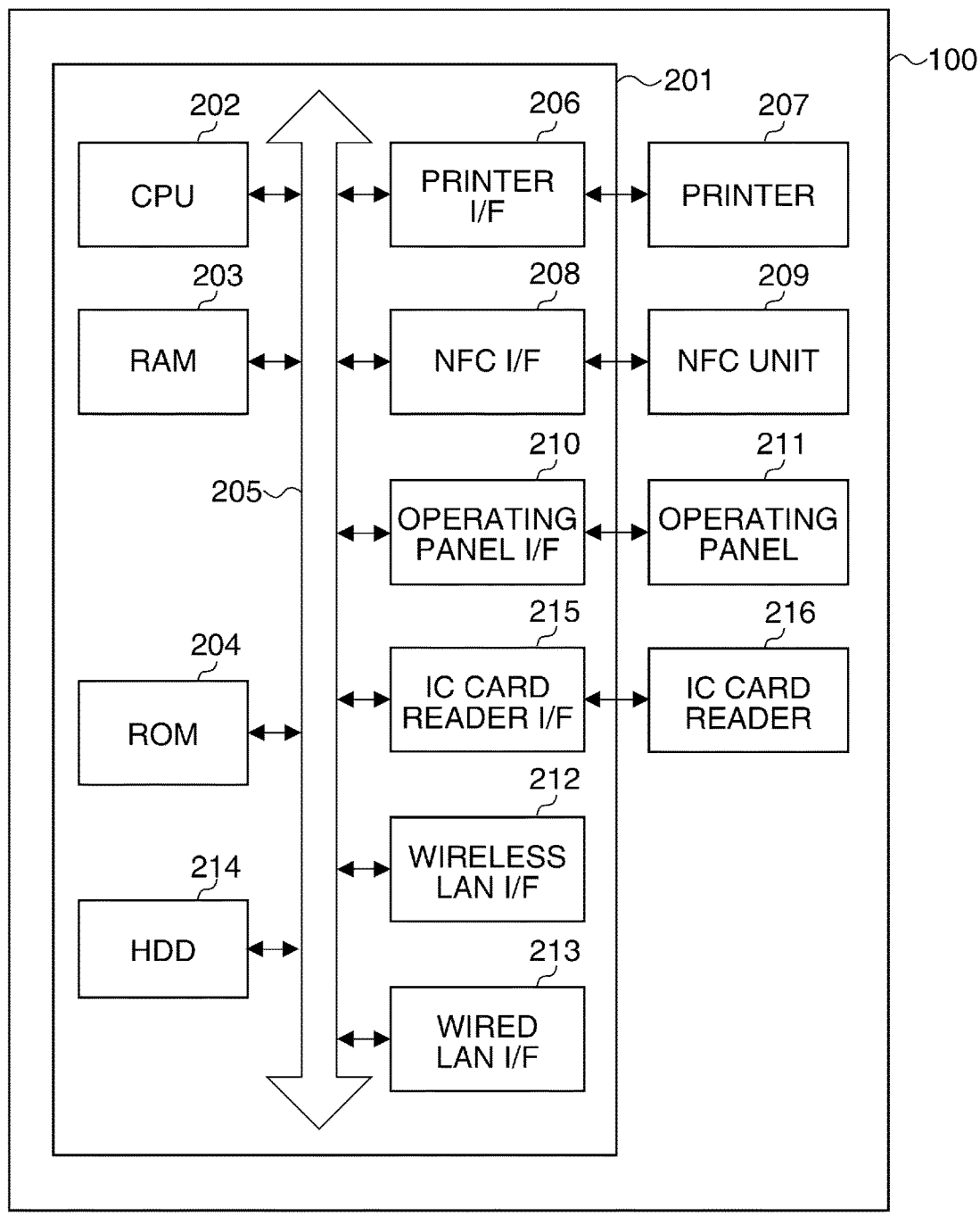
FIG. 2 is a block diagram schematically showing an arrangement of the image forming apparatus in FIG. 1.

FIG. 2 is a block diagram schematically showing an arrangement of the image forming apparatus 100 in FIG. 1.

The image forming apparatus 100 in the figure carries out NFC communication with a communication terminal, to be described later, such as a mobile terminal or a PC. The image forming apparatus 100 has a control unit 201, which has a CPU 202.

The CPU 202 reads out control programs stored in the ROM 204 and provides various types of control such as communication control, to be described later. The RAM 203 is used as a temporary storage area such as a main memory or a work area for the CPU 202. A hard disk drive (HDD) 214 stores image data, various programs, various information tables, and so on.

A printer I/F 206 connects a printer (printer engine) 207 and the control unit 201 together. The printer 207 performs printing on a sheet fed from a sheet feeding cassette (not shown) based on print data (image data) received via the printer I/F 206.

An NFC I/F 208 connects the NFC unit 209 and the control unit 201 together. The NFC unit 209 holds NDEF data sent from the control unit 101 via the NFC I/F 108. When the communication terminal comes within an NFC communication zone, the NFC unit 209 transfers the NDEF data to the communication terminal using NFC (near-field wireless communication).

When the NFC unit 209 has transferred the NDEF data to the communication terminal, the NFC unit 209 notifies the control unit 201 to this effect via the NFC I/F 108.

The CPU 202 processes a print job received via a wireless LAN I/F 212 or a wired LAN I/F 213 and outputs the processed print job as print data to the printer I/F 206. An operating panel I/F 210 connects an operating panel 211 and the control unit 201 together. The operating panel 211 has a liquid crystal display unit with a touch panel function, a keyboard, and so on.

An IC card reader I/F 215 connects an IC card reader 216 and the control unit 201 together. The IC card reader 216 is a device for reading data recorded on an IC card. The IC card reader 216 is for use in user authentication using an IC card.

The CPU 202 sends and receives a variety of data to and from a communication terminal such as a mobile terminal by wireless communication via the wireless LAN I/F 212. The CPU 202 sends and receives a variety of data to and from a communication terminal such as a client terminal using a wired LAN (Ethernet (registered trademark)) via the wired LAN I/F 213.

It should be noted that the blocks in the control unit 201 are connected to one another via a system bus 205.

Figure 3:
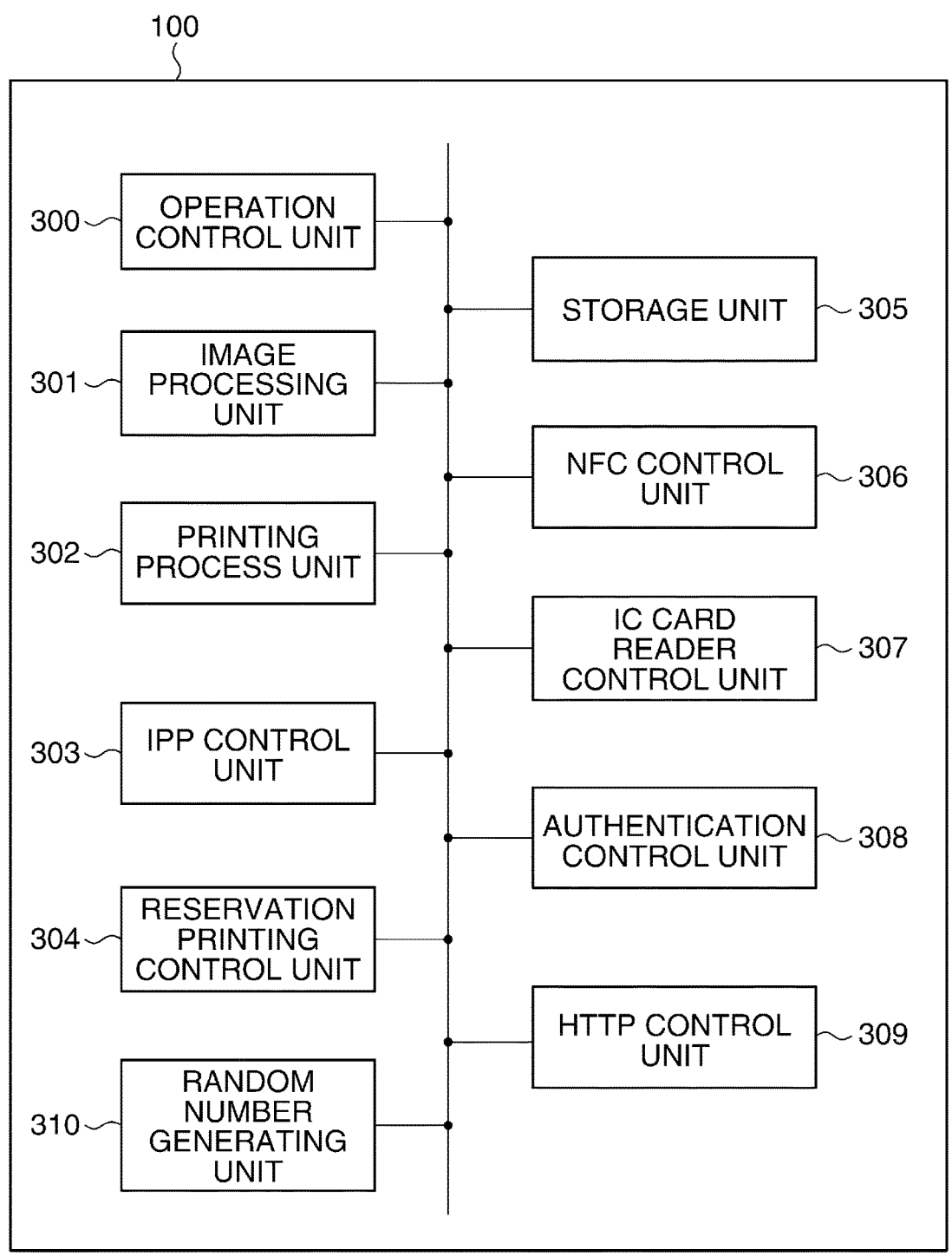
FIG. 3 is a block diagram schematically showing a software arrangement of the image forming apparatus in FIG. 2.

FIG. 3 is a block diagram showing a software arrangement of the image forming apparatus 100 in FIG. 2. It should be noted that functional units in FIG. 3 are caused to operate by the CPU 202 executing control programs stored in the ROM 204 or the HDD 214.

An operation control unit 300 controls the operating panel 211. For example, the operation control unit 300 displays an operation menu on the operating panel 211. Further, the operation control unit 300 receives a user instruction on the operation menu.

The operation control unit 300 also notifies the other functional units of the received user instruction and displays a result of the instruction performed in accordance with the received user instruction on the operation panel 211.

An image processing unit 301 carries out a process in which it renders a print job as image data for printing (print data). A printing process unit 302 sends print data, which is obtained as a result of rendering by the image processing unit 301, to the printer 207 via the printer I/F 206 and carries out a printing process.

A storage unit 305 stores designated data in the ROM 203 and the HDD 214 or reads out data stored in the ROM 204 and the HDD 214 in accordance with instructions from the other functional units. In the example shown in the figure, the storage unit 305 manages user authentication information.

An NFC control unit 306 controls the NFC unit 209 via the NFC I/F 208. For example, the NFC control unit 306 carries out a process in which it writes NDEF information in the NFC unit 209 and also carries out a process in which it reads out NDEF information from the NFC unit 209. NDEF data is, for example, device identifying information for use in uniquely identifying the image forming apparatus 100.

An IC card reader control unit 307 carries out a process in which it reads IC card information from the IC card reader 216. Examples of the IC card information include user information for use in user authentication. An authentication control unit 308 carries out an authentication process using the user authentication information stored in the storage unit 305. An HTTP control unit 309 controls HTTP.

An IPP control unit 300 controls IPP running on HTTP. A reservation printing control unit 304 controls, for example, a reservation printing function which the image forming apparatus 100 has. A random number generating unit 310 generates random numbers for generating random tokens.

Figure 4:
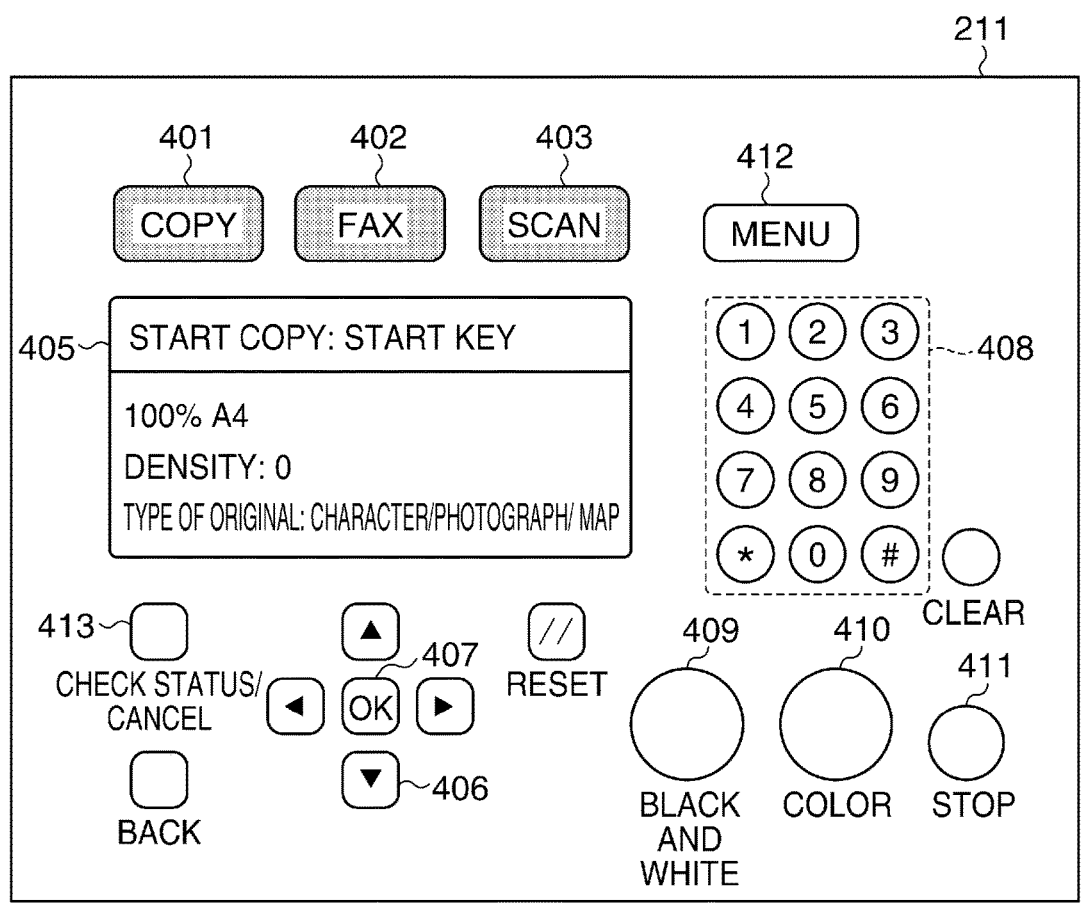
FIG. 4 is a view useful in explaining an example of an operating panel in FIG. 2.

FIG. 4 is a view useful in explaining an example of the operating panel 211 in FIG. 2.

The operating panel 211 is equipped with a display panel 405 such as an LCD. A copy button 401 is used to make a copy using the image forming apparatus 100, and when the copy button 401 is selected, a copy operation screen is displayed on the display panel 405. A FAX button 402 is used to send a facsimile using the image forming apparatus 100, and when the FAX button 402 is selected, a FAX operation screen is displayed on the display panel 405.

A scan button 403 is used to perform scanning using the image forming apparatus 100, and when the scan button 403 is selected, a scanning operation screen is displayed on the display panel 405. A numeric keypad 408 is used to input, for example, numerals. An OK key 407 is used to, for example, confirm what is displayed on the display panel 405.

A direction key 406 is used to, for example, choose a menu or the like displayed on the display panel 405. A black-and-white copy button 409 and a color copy button 410 are selected to make a black-and-white copy and a color copy, respectively. A stop button 411 is selected to stop a process.

A menu button 412 is used to display a menu screen, which is for use in configuring settings on the image forming apparatus 100, on the display panel 405. A status check/cancel button 413 is used to display a status checking screen for use in, for example, checking a status of printing in the image forming apparatus 100.

Figure 5:
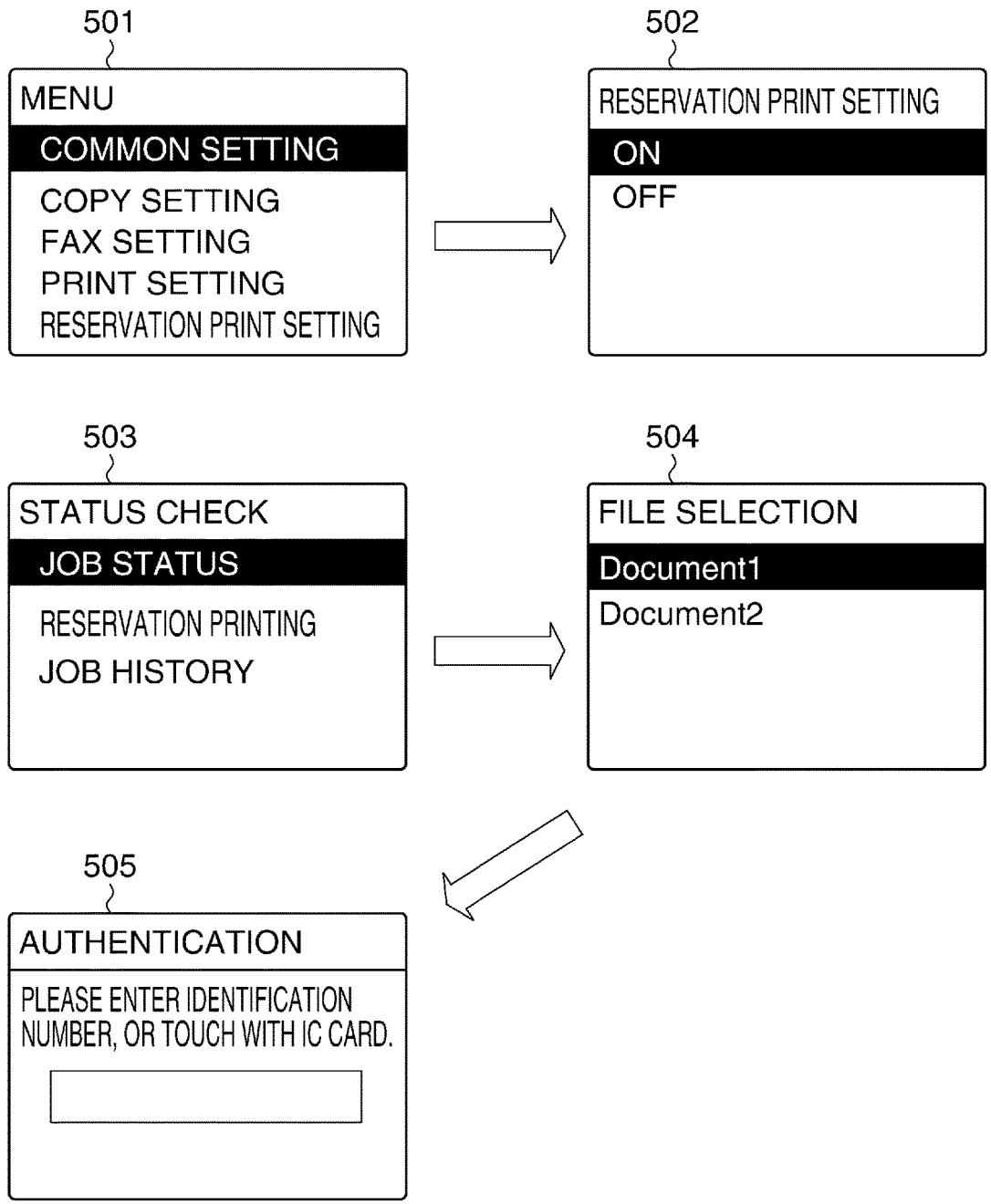
FIG. 5 is a view useful in explaining an operation screen for use in performing reservation printing by the image forming apparatus in FIG. 2.

FIG. 5 is a view useful in explaining an operation screen for use in performing reservation printing by the image forming apparatus 100 in FIG. 2.

Now assuming that a user selects the menu button 412 on the operating panel 211, the operation control unit 300 displays a menu screen 501 on the display panel 405. When the user selects a reservation print setting on the menu screen 501, the operation control unit 300 displays a reservation print setting screen 502 on the display panel 405.

When the user selects ON on the reservation print setting screen 502, the operation control unit 300 stores a received print job as a reservation print job in the storage unit 305. On the other hand, when the user selects OFF on the reservation print setting screen 502, the operation control unit 300 handles a received print job as a normal print job and causes the printing process unit 302 to carry out a printing process.

When the user selects the status check/cancel button 413 on the operating panel 211, the operation control unit 300 displays a status check screen 503 on the display panel 405. When the user selects reservation printing on the status check screen 503, the operation control unit 300 displays a file selection screen 504 on the display panel 405.

On the file selection screen 504, reservation print jobs stored in the storage unit 305 are displayed. In the example shown in the figure, two reservation print jobs, i.e. Document 1 and Document 2 are stored in the storage unit 305. When the user selects a file on the file selection screen 504, the operation control unit 300 displays an authentication screen 505 on the display panel 405.

The user undergoes authentication by entering a personal identification number on the authentication screen 505 or touching with an IC card. To enter a personal identification number, the user uses the numeric keypad 408 or the like. When the input personal identification number matches a personal identification number set for the selected file, the authentication control unit 308 determines that authentication is successful.

In touching with an IC, the user touches the IC card to the IC card reader 216. The IC card reader control unit 307 reads a personal identification number from the IC card touching the IC card reader 216. When the personal identification number read from the IC card matches a personal identification number set for the selected file, the authentication control unit 308 determines that authentication is successful.

When authentication is successful, the reservation printing control unit 304 carries out a printing process described hereafter for the selected file. First, the reservation printing control unit 304 reads the selected file from the storage unit 305. The image processing unit 301 then renders this file as print data. Next, the printing process unit 302 sends the print data to the printer 207 via the printer I/F 206 and carries out a printing process in accordance with the print data.

Figure 6:
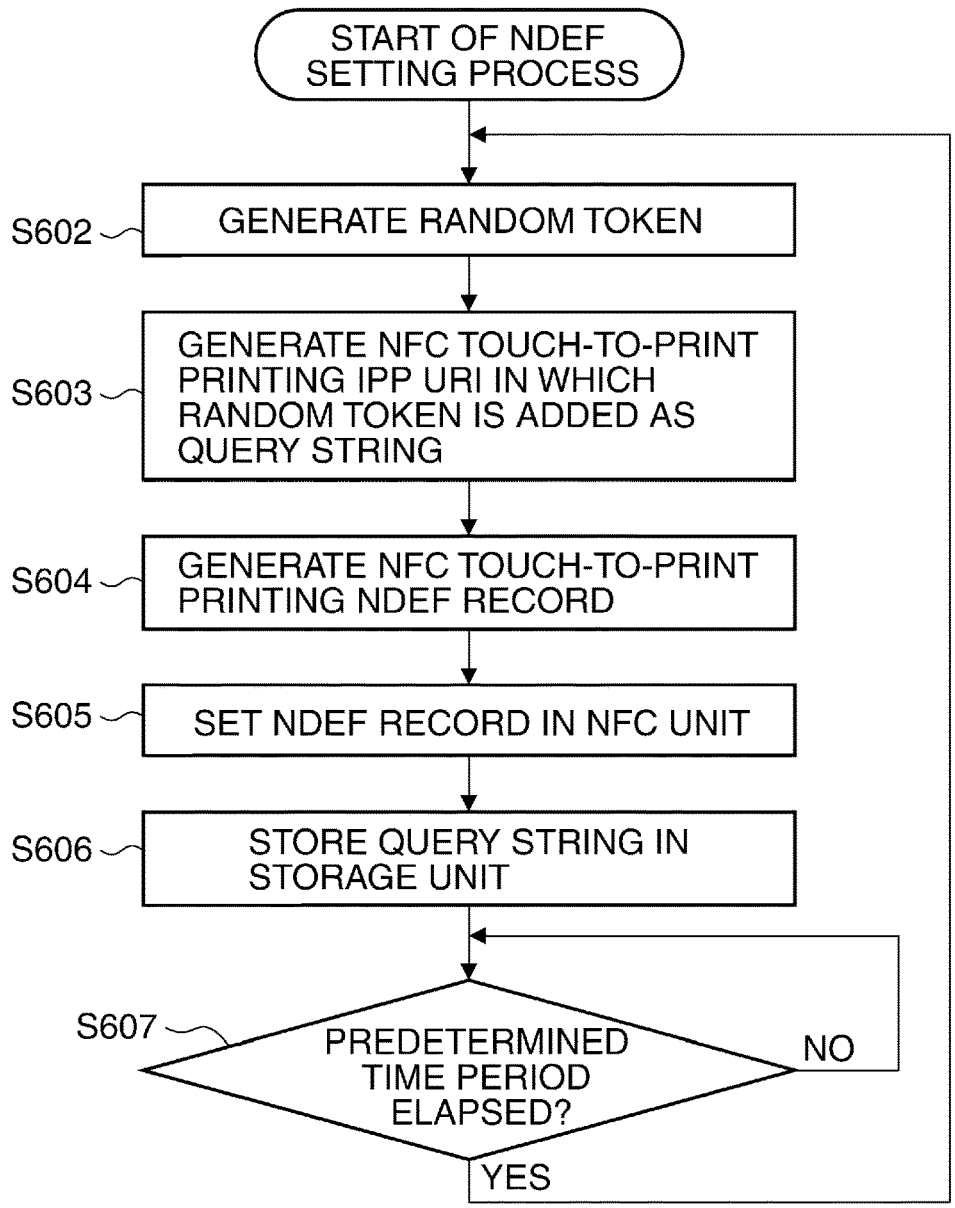
FIG. 6 is a flowchart useful in explaining an exemplary NDEF setting process which is carried out by the image forming apparatus in FIG. 2.

FIG. 6 is a flowchart useful in explaining an exemplary NDEF setting process which is carried out by the image forming apparatus 100 in FIG. 2. It should be noted that FIG. 6 shows the NDEF setting process in a case where the reservation print setting is configured at ON.

When the NDEF setting process is started, the NFC control unit 306 causes the random number generating unit 310 to generate a random number to generate a random token (step S602). The NFC control unit 306 then generates a character string in which the random token is added as a query string to an IPP URI (uniform resource identifier) (described later with reference to FIG. 7), which is a base, as an NFC touch-to-print printing IPP URI (step S603).

Then, the NFC control unit 306 sets the NFC touch-to-print printing IPP URI as a URI record to generate an NFC touch-to-print printing NDEF record (step S604). The URI record and the NFC touch-to-print printing NDEF record will be described later with reference to FIG. 8. The NFC control unit 306 then sets the NDEF record in the NFC unit 209 (step S605). After that, the NFC control unit 306 stores the query string in the storage unit 305 (step S606).

Then, the NFC control unit 306 judges whether or not a predetermined time period has elapsed (step S607). When the predetermined time period has not elapsed (NO in the step S607), the NFC control unit 306 stands by. On the other hand, when the predetermined time period has elapsed (YES in the step S607), the process returns to the step S602, in which the NFC control unit 306 in turn generates a random token.

In the above described manner, the NFC control unit 306 carries out the NDEF setting process at predetermined time intervals (that is, fixed time intervals), and in response to an instruction to terminate the NDEF setting process, the NFC control unit 306 terminates the NDEF setting process.

Figure 7:
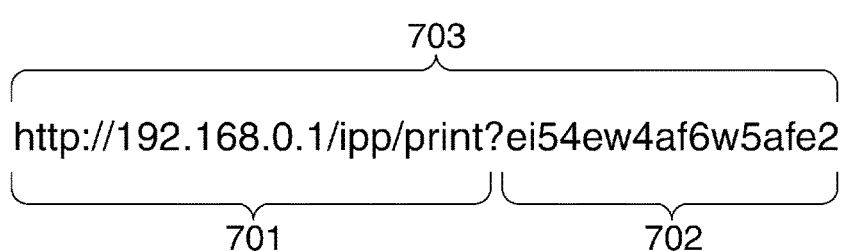
FIG. 7 is a view showing an example of an NFC touch-to-print printing IPP URI described with reference to FIG. 6.

FIG. 7 is a view showing an example of the NFC touch-to-print printing IPP URI described above with reference to FIG. 6.

Referring to FIG. 7, the NFC touch-to-print printing IPP URI 703 is comprised of an IPP URI 701 and a random token 702. The IPP URI 701 is a base when the NFC touch-to-print printing IPP URI 702 is generated, and in normal IPP printing, the IPP URI 701 is used for the IPP control unit 303 to receive an IPP print request. The random token 702 is added as a query string to the IPP URI 701.

Figure 8:
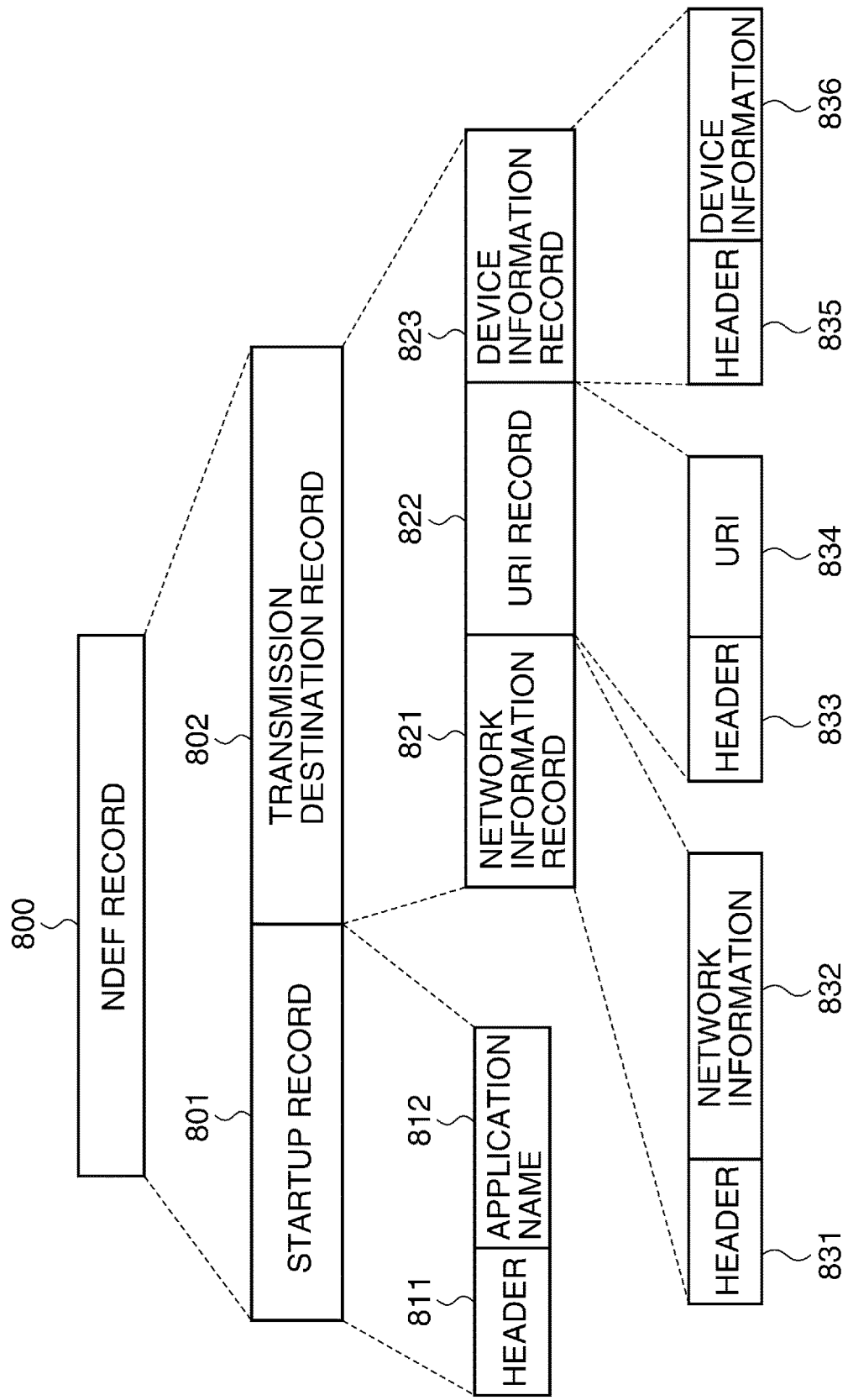
FIG. 8 is a view showing an example of an NDEF record for use in performing NFC touch-to-print printing described with reference to FIG. 6.

FIG. 8 is a view showing an exemplary NDEF record for use in performing NFC touch-to-print printing described above with reference to FIG. 6.

Referring to FIG. 8, the NDEF record 800 has at least a startup record 801 for starting NFC touch-to-print printing, and a transmission destination record 802 in which information required to perform NFC touch-to-print printing is stored.

As the startup record 801, instruction information for causing a communication terminal, which has read this record, to start NFC touch-to-print printing is stored. For example, the startup record 801 has a header 811 as which header information on a startup information record is stored, and an application name 812 as which a package name of NFC touch-to-print printing is stored.

As the header 811, information indicating that the startup record 801 is a record which plays a role for starting an application is stored in a format defined by the NFC forum. A character string including a name of NFC touch-to-print printing is stored as the application name 812.

The transmission destination record 802 has three records, i.e. a network information record 821, a URI record 822, and a device information record 823. The network information record 821 has a header 831 and network information 832.

As the header 831, information indicating that network information is stored as the network information record 821 is stored in a format defined by the NFC forum.

Information for identifying the image forming apparatus 100, which is caused to perform NFC touch-to-print printing, on a network is stored as the network information 832. For example, an IP address, a MAC address, a UUID, etc. assigned to the image forming apparatus 100 are stored as the network information 832.

The URI record 822 is comprised of a header 833 and a URI 834. In the header 833, information indicating that the URI record 822 is a record in which a uniform resource identifier (URI) is stored is stored in a format defined by the NFC forum. A URI for use in sending a print job to the IPP control unit 303 using the internet printing protocol (IPP) is stored as the URI 834.

The device information record 823 is comprised of a header 835 and device information 836. In the header 835, information indicating that the device information record 823 is a record in which device information is stored is stored in a format defined by the NFC forum.

Device information which is to be referred to during NFC touch-to-print printing is stored as the device information 836. For example, a vendor name, a model name, a product name, or the like of the image forming apparatus 100 is stored as the device information 736.

It should be noted that in the transmission destination record 802, records other than the records 821 to 823 described above may be stored, and some of the records 821 to 823 described above may not be stored. Further, the NDEF record 800 may include records other than the startup record 801 and the transmission destination record 802.

Figure 9:
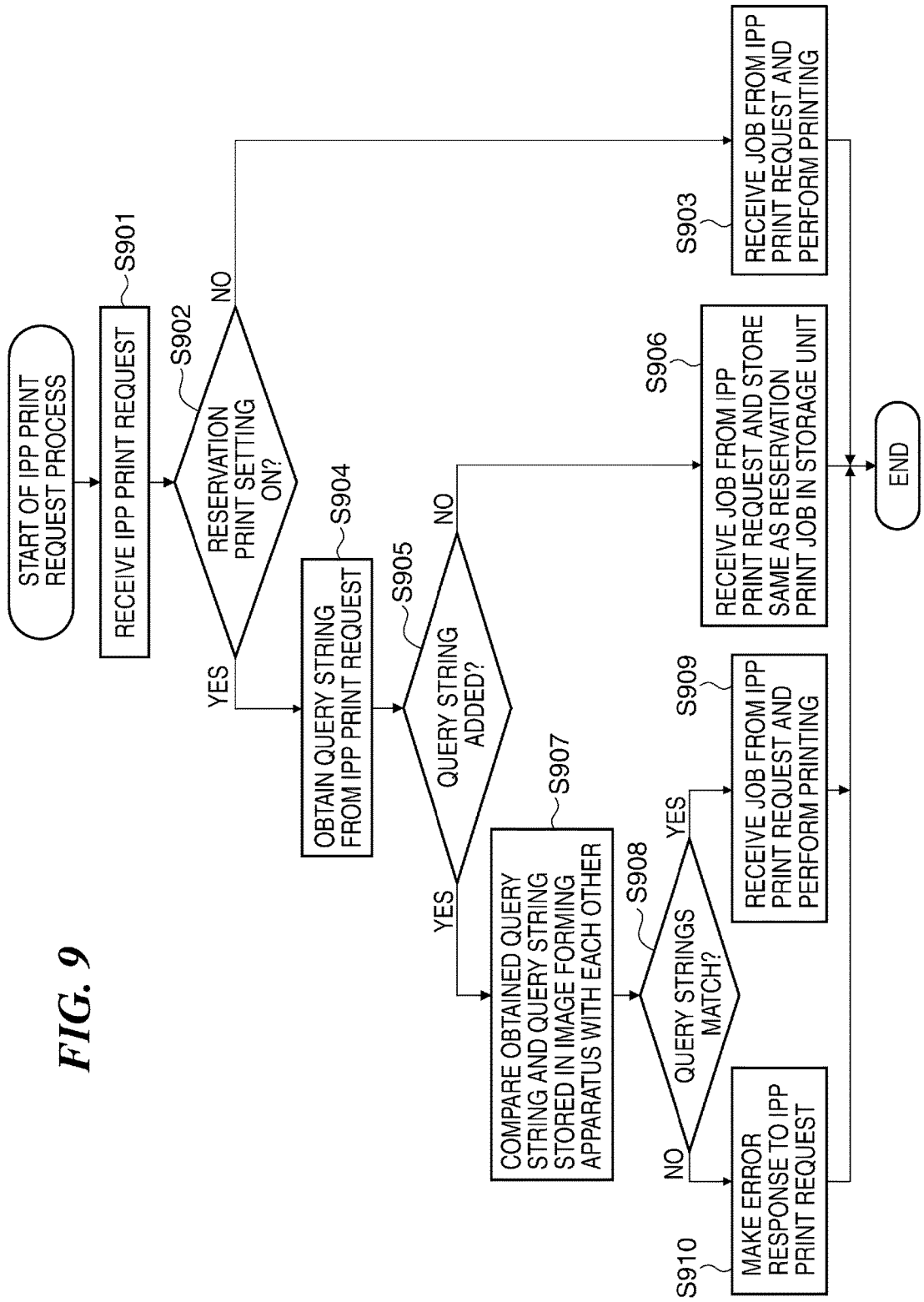
FIG. 9 is a flowchart useful in explaining an IPP printing request process which is carried out by the image forming apparatus in FIG. 2.

FIG. 9 is a flowchart useful in explaining an IPP print request process which is carried out by the image forming apparatus 100 in FIG. 2.

Upon receiving an IPP print request from an external apparatus such as the communication terminal 110 (step S901), the IPP control unit 303 ascertains whether or not the reservation print setting is configured at ON (step S902).

When the reservation print setting is configured at OFF (NO in the step S902), the IPP control unit 303 receives a print job from the IPP print request and causes the image processing unit 301 and the printing process unit 302 to carry out a printing process (step S903). The IPP control unit 303 then terminates the IPP print request process.

When the reservation print setting is configured at ON (YES in the step S902), the IPP control unit 303 obtains a query string from the IPP print request (step S904). The IPP control unit 303 then ascertains the presence or absence of a query string (step S905).

When there is no query string (NO in the step S905), the IPP control unit 303 judges that the IPP print request is a request for a normal IPP print job, not a request for NFC touch-to-print printing, receives a print job from the IPP print request, and stores the received print job as a reservation print job in the storage unit 305 (step S906). The IPP control unit 303 then terminates the IPP print request process.

On the other hand, when there is a query string (YES in the step S905), the IPP control unit 303 carries out a comparing process in which it compares this query string and a query string stored in the storage unit 305 with each other (step S907). The IPP control unit 303 then ascertains whether or not the obtained query string matches the query string stored in the storage unit 305 (step S908).

When the above two query strings match each other (YES in the step S908), the IPP control unit 303 judges that the communication terminal 110 which obtained an NDEF record from the NFC unit 209 has performed NFC touch-to-print printing. The IPP control unit 303 receives a print job from the IPP print request and causes the image processing unit 301 and the printing process unit 302 to carry out a printing process (step S909). The IPP control unit 303 then terminates the IPP print request process.

On the other hand, when the above two query strings do not match each other (NO in the step S908), the IPP control unit 303 makes an error response to the IPP print request (step S910). The IPP control unit 303 then terminates the IPP print request process.

As described above, in the first embodiment of the present invention, when reservation printing is selected, the user is allowed to perform NFC touch-to-print printing without undergoing an authentication process, and hence the user performs printing with ease. Namely, only when NFC touch-to-print printing is to be performed, an authentication process for reservation printing is dispensed with so that the user can easily perform printing, whereas for print jobs other than those for NFC touch-to-print printing, reservation printing is performed to enhance the security of documents and improve convenience for the user.

A description will now be given of an image forming apparatus according to a second embodiment of the present invention. It should be noted that arrangements (a hardware arrangement and a software arrangement) of the image forming apparatus according to the second embodiment are the same as those of the image forming apparatus according to the first embodiment.

Figure 10:
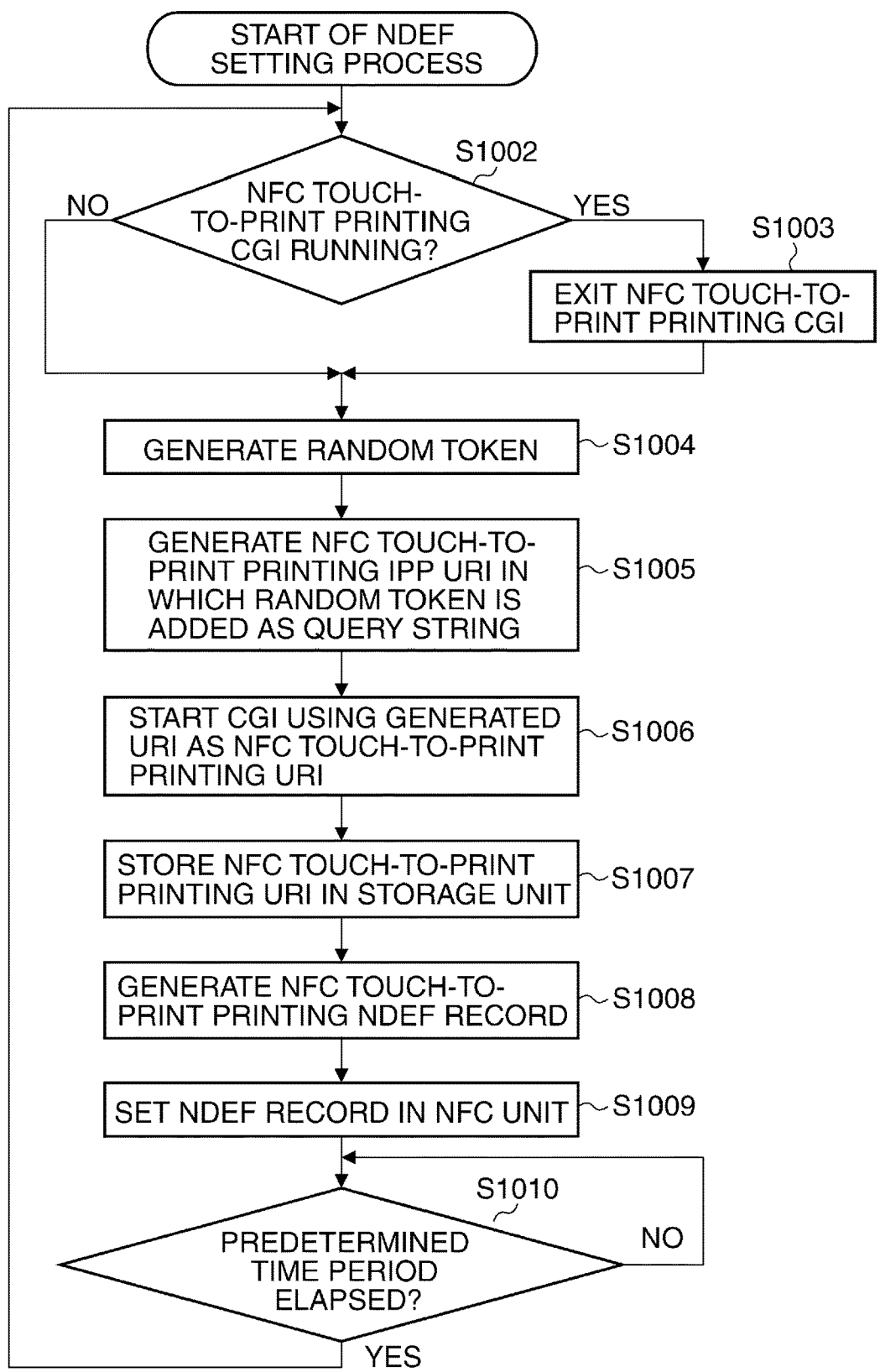
FIG. 10 is a flowchart useful in explaining an exemplary NDEF setting process which is carried out by an image forming apparatus according to a second embodiment of the present invention.

FIG. 10 is a flowchart useful in explaining an exemplary NDEF setting process which is carried out by the image forming apparatus according to the second embodiment of the present invention. It should be noted that FIG. 10 shows the NDEF setting process in a case where the reservation printing setting is configured at ON.

When the NDEF setting process is started, the IPP control unit 303 ascertains whether or not an NFC touch-to-print printing IPP CGI (Common Gateway Interface) is running (step S1002). When the NFC touch-to-print printing IPP CGI is running (YES in the step S1002), the IPP control unit 303 exits the NFC touch-to-print printing IPP CGI (step S1003).

After that, the NFC control unit 306 causes the random number generating unit 310 to generate a random number to generate a random token (step S1004). It should be noted that when the NFC touch-to-print printing IPP CGI is not running (NO in the step S1002), the process proceeds to step S1004.

The NFC control unit 306 then generates a character string in which the random token is added to an IPP URI (uniform resource identifier), which is a base, as an NFC touch-to-print printing IPP URI (step S1005). The IPP control unit 303 then starts the NFC touch-to-print printing IPP CGI of which a receiving URI is the NFC touch-to-print printing IPP CGI (step S1006).

Next, the NFC control unit 306 stores the NFC touch-to-print printing IPP URI in the storage unit 305 (step S1007). The NFC control unit 306 then generates an NFC touch-to-print printing NDEF record in which the NFC touch-to-print printing IPP URI is set as a URI record (step S1008) (described later with reference to FIG. 11).

Then, the NFC control unit 306 sets the NDEF record in the NFC unit 209 (step S1009). After that, the IPP control unit 303 judges whether or not a predetermined time period has elapsed (step S1010). When the predetermined time period has not elapsed (NO in the step S1010), the IPP control unit 303 stands by. On the other hand, when the predetermined time period has elapsed (YES in the step S1010), the process returns to the step S1002, in which the IPP control unit 303 in turn ascertains whether or not the NFC touch-to-print printing IPP CGI is running.

In the above described manner, the NDEF setting process is carried out at predetermined time intervals (that is, fixed time intervals), and in response to an instruction to terminate the NDEF setting process, the NDEF setting process is terminated.

Figure 11:
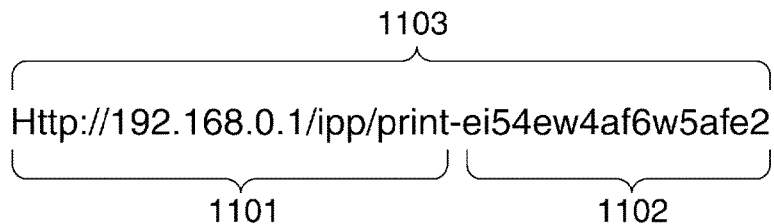
FIG. 11 is a view showing an example of an NFC touch-to-print printing IPP URI described above with reference to FIG. 10.

FIG. 11 is a view showing an example of the NFC touch-to-print printing IPP URI described above with reference to FIG. 10.

Referring to FIG. 11, the NFC touch-to-print printing IPP URI 1103 is comprised of an IPP URI 1101 and a random token 1102. The IPP URI 1101 is an IPP URI which is a base when the NFC touch-to-print printing IPP URI 1103 is generated, and in normal IPP printing, the IPP URI 1101 is used for the IPP control unit 303 to receive an IPP print request. The random token 1102 is added as a query string to the IPP URI 1101.

It should be noted that the NFC touch-to-print printing NDEF according to the second embodiment is the same as the NFC touch-to-print printing NDEF 800 according to the first embodiment.

Figure 12:
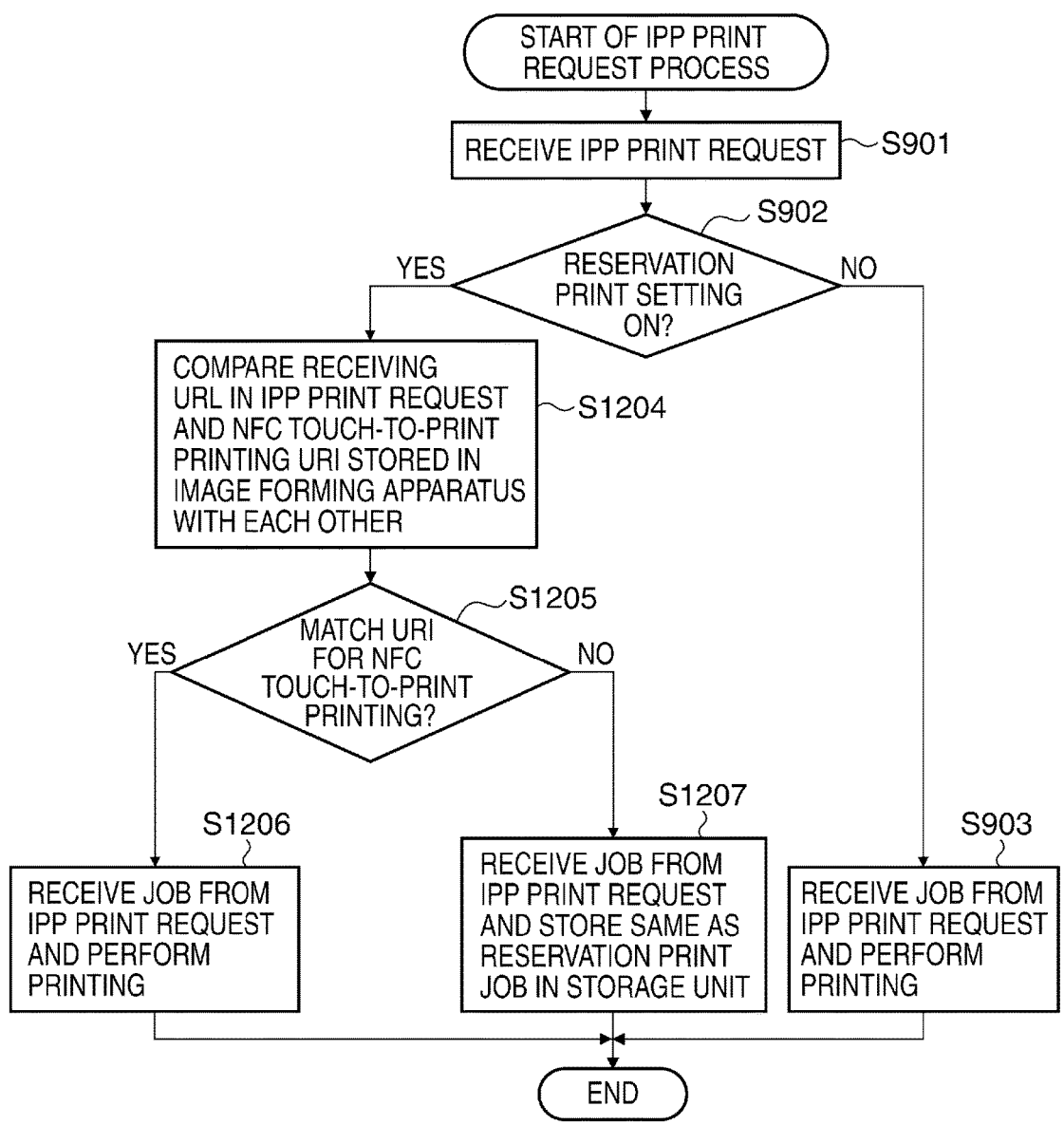
FIG. 12 is a flowchart useful in explaining an IPP printing request process which is carried out by the image forming apparatus according to the second embodiment of the present invention.

FIG. 12 is a flowchart useful in explaining an IPP print request process which is carried out by the image forming apparatus according to the second embodiment of the present invention.

It should be noted that in FIG. 12, the same steps as those in the flowchart of FIG. 9 are designated by the same reference numerals, and description thereof is omitted.

When the reservation print setting is configured at ON in the step S902, the IPP control unit 303 carries out a comparing process in which it compares a receiving URI in an IPP print request and an NFC touch-to-print printing URI, which is read from the storage unit 305, with each other (step S1204). As a result of this comparison, the IPP control unit 303 judges whether or not the receiving URI and the NFC touch-to-print printing URI match each other (step S1205).

When the receiving URI and the NFC touch-to-print printing URI match each other (YES in the step S1205), the IPP control unit 303 receives a print job from the IPP print request and causes the image processing unit 301 and the printing process unit 302 to carry out a printing process (step S1206). The IPP control unit 303 then terminates the IPP print request process.

On the other hand, when the receiving URI and the NFC touch-to-print printing URI do not match each other (NO in the step S1205), the IPP control unit 303 receives a print job from the IPP print request and stores the received print job as a reservation print job in the storage unit 305 (step S1207). The IPP control unit 303 then terminates the IPP print request process.

Although in the second embodiment described above, an NFC touch-to-print printing URI is randomly generated, an NFC touch-to-print printing URI may be fixedly set.

Figure 13:
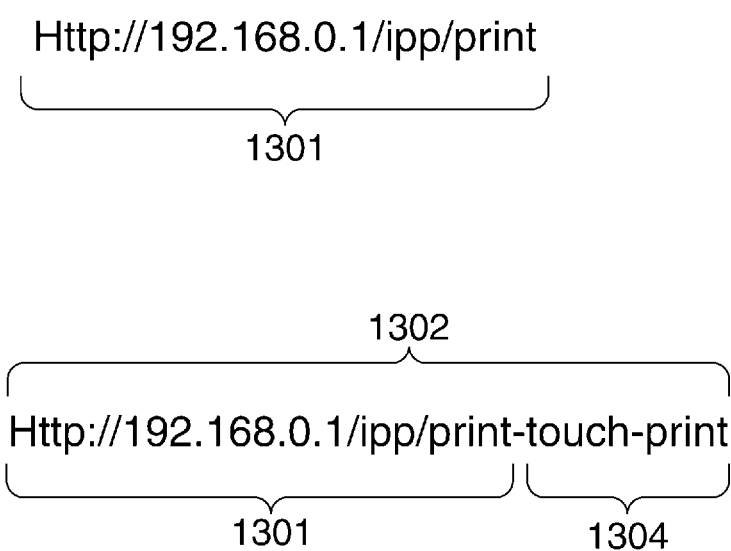
FIG. 13 is a view showing another example of the NFC touch-to-print printing IPP URI which is set by the image forming apparatus according to the second embodiment of the present invention.

FIG. 13 is a view showing another example of the NFC touch-to-print printing IPP URI which is set by the image forming apparatus according to the second embodiment of the present invention.

Referring to FIG. 13, an IPP URI 1301 is a normal IPP URI for use in IPP printing other than NFC touch-to-print printing. An IPP URI 1302 is an NFC touch-to-print printing IPP URI which is for use in IPP printing using NFC touch-to-print printing.

Here, in the NFC touch-to-print printing IPP URI 1302, a character string 1304 for NFC touch-to-print printing is added to the normal IPP URI 1301. On startup of the image forming apparatus 100, an IPP CGI which receives the above two URIs is started.

It should be noted that an NFC touch-to-print printing NDEF in this case is the same as the NFC touch-to-print printing NDEF 800 according to the first embodiment. Also, when an IPP print request is received, the same process as the process described above with reference to FIG. 12 is carried out.

As described above, in the second embodiment of the present invention as well, when reservation printing is selected, the user is allowed to perform NFC touch-to-print printing without undergoing an authentication process, and hence the user performs printing with ease.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-168365, filed Aug. 21, 2014, which is hereby incorporated by reference wherein in its entirety.

What is claimed is:

1. A control method for a printing apparatus having a reservation function of reserving a received print job in a predetermined storage without starting printing of the received print job until user authentication information is received, a first wireless communicator that carries out wireless communication based on near-field communication (NFC), and a second wireless communicator that carries out wireless communication based on a communication method different from that for the first wireless communicator, and being configured to perform a printing process in accordance with an Internet Printing Protocol (IPP) print request received by the second wireless communicator, the control method comprising:

generating a random character string;
generating NFC Data Exchange Format (NDEF) data to which a Uniform Resource Identifier (URI) to which the generated random character string is added as a query string is set;
writing the generated NDEF data in the first wireless communicator;
storing the generated random character string;
determining whether to override the reservation function by determining, when the printing apparatus receives an IPP print request via the second wireless communicator in a state where the reservation function has been set to be executed in the printing apparatus before receipt of the IPP print request, whether a URI of the received IPP print request includes the generated random character string as the query string;
reserving, in a case where it is determined that the URI of the received IPP print request does not include the generated random character string as the query string, a print job corresponding to the received IPP print request in the predetermined storage; and
overriding the reservation function by starting printing of the print job corresponding to the received IPP print request without reserving the print job in the predetermined storage in a case where it is determined that the URI of the received IPP print request includes the generated random character string as the query string and it is determined that the generated random character string as the query string included in the URI of the received IPP print request matches the stored random character string,
wherein printing of the print job reserved in the predetermined storage is not started until the printing apparatus receives the user authentication information.

2. A non-transitory computer-readable storage medium storing a program for causing a computer to execute a control method for a printing apparatus having a reservation function of reserving a received print job in a predetermined storage without starting printing of the received print job until user authentication information is received, a first wireless communicator that carries out wireless communication based on near-field communication (NFC), and a second wireless communicator that carries out wireless communication based on a communication method different from that for the first wireless communicator, and being configured to perform a printing process in accordance with an Internet Printing Protocol (IPP) print request received by the second wireless communicator, the control method comprising:

generating a random character string;
generating NFC Data Exchange Format (NDEF) data to which a Uniform Resource Identifier (URI) to which the generated random character string is added as a query string is set;
writing the generated NDEF data in the first wireless communicator;
storing the generated random character string;
determining whether to override the reservation function by determining, when the printing apparatus receives an IPP print request via the second wireless communicator in a state where the reservation function has been set to be executed in the printing apparatus before receipt of the IPP print request, whether a URI of the received IPP print request includes the generated random character string as the query string;
reserving, in a case where it is determined that the URI of the received IPP print request does not include the generated random character string as the query string, a print job corresponding to the received IPP print request in the predetermined storage; and
overriding the reservation function by starting printing of the print job corresponding to the received IPP print request without reserving the print job in the predetermined storage in a case where it is determined that the URI of the received IPP print request includes the generated random character string as the query string and it is determined that the generated random character string as the query string included in the URI of the received IPP print request matches the stored random character string,
wherein printing of the print job reserved in the predetermined storage is not started until the printing apparatus receives the user authentication information.

3. A printing apparatus having a reservation function of reserving a received print job in a predetermined storage without starting printing of the received print job until user authentication information is received, comprising:
- a first wireless communicator that carries out wireless communication based on near-field communication (NFC);
- a second wireless communicator that carries out wireless communication based on a communication method different from that for the first wireless communicator, the printing apparatus being configured to perform a printing process in accordance with an Internet Printing Protocol (IPP) print request received by the second wireless communicator;
- a memory; and
- a processor configured to execute computer executable instructions recorded on the memory, the computer executable instructions including instructions, that when executed by the processor, cause the printing apparatus to:
- generate a random character string;
- generate NFC Data Exchange Format (NDEF) data to which a Uniform Resource Identifier (URI) to which the generated random character string is added as a query string is set;
- write the generated NDEF data in the first wireless communicator;
- store the generated random character string;
- determine whether to override the reservation function by determining, when the printing apparatus receives an IPP print request via the second wireless communicator in a state where the reservation function has been set to be executed in the printing apparatus before receipt of the IPP print request, whether a URI of the received IPP print request includes the generated random character string as the query string;
- reserve, in a case where it is determined that the URI of the received IPP print request does not include the generated random character string as the query string, a print job corresponding to the received IPP print request in the predetermined storage; and
- override the reservation function by starting printing of the print job corresponding to the received IPP print request without reserving the print job in the predetermined storage in a case where it is determined that the URI of the received IPP print request includes the generated random character string as the query string and it is determined that the generated random character string as the query string included in the URI of the received IPP print request matches the stored random character string,
- wherein printing of the print job reserved in the predetermined storage is not started until the printing apparatus receives the user authentication information.

4. The control method according to claim 1, wherein the NDEF data includes an address of the printing apparatus.

5. The control method according to claim 1, wherein in a case where the query string included in the URI of the received IPP print request does not match the stored random character string, an error response is sent to a source terminal of the IPP print request via the second wireless communicator.

6. The control method according to claim 1, wherein the random character string is changed every lapse of a predetermined time period, and
the changed random character string is added to the URI as the query string and set to the NDEF data.

7. The control method according to claim 1, wherein when the IPP print request is received via the second wireless communicator in a state where the reservation function is set not to be executed, printing of the print job corresponding to the received IPP print request is started irrespective of whether the query string is included in the URI of the received IPP print request.

8. A control method for a printing apparatus having a reservation function of reserving a received print job in a predetermined storage without starting printing of the received print job until user authentication information is received, having a first wireless communicator that carries out wireless communication based on near-field communication (NFC) and a second wireless communicator that carries out wireless communication based on a communication method different from that for the first wireless communicator, and being configured to perform a printing process in accordance with an Internet Printing Protocol (IPP) print request received by the second wireless communicator, the control method comprising:
- generating a random character string;
- generating NFC Data Exchange Format (NDEF) data to which a Uniform Resource Identifier (URI) to which the generated random character string is added as a query string is set;
- writing the generated NDEF data in the first wireless communicator;
- storing the URI including the generated random character string added as the query string;
- starting a Common Gateway Interface (CGI) of which a receiving URI is the URI;
- determining whether to override the reservation function by determining, when the printing apparatus receives an IPP print request via the second wireless communicator in a state where the reservation function has been set to be executed in the printing apparatus before receipt of the IPP print request, whether a URI of the received IPP print request matches the stored URI including the generated random character string added as the query string;
- reserving, in a case where it is determined that the URI of the received IPP print request does not match the stored URI including the generated random character string added as the query string, a print job corresponding to the received IPP print request in the predetermined storage; and
- overriding the reservation function by starting printing of the print job corresponding to the IPP print request without reserving the print job in the predetermined storage in a case where it is determined that that the URI of the received IPP print request matches the stored URI including the generated random character string added as the query string.

9. The control method according to claim 8, wherein when the IPP print request is received via the second wireless communicator in a state where the reservation function is set to be disabled, printing of the print job corresponding to the received IPP print request is started irrespective of whether the URI of the received IPP print request matches the stored URI.

10. The control method according to claim 8,
wherein the random character string is changed every lapse of a predetermined time period, and
the changed random character string is added to the URI as the query string and set to the NDEF data.

11. A non-transitory computer-readable storage medium storing a program for causing a computer to execute a control method for a printing apparatus having a reservation function of reserving a received print job in a predetermined storage without starting printing of the received print job until user authentication information is received, having a first wireless communicator that carries out wireless communication based on near-field communication (NFC) and a second wireless communicator that carries out wireless communication based on a communication method different from that for the first wireless communicator, and being configured to perform a printing process in accordance with an Internet Printing Protocol (IPP) print request received by the second wireless communicator, the control method comprising:

generating a random character string;

generating NFC Data Exchange Format (NDEF) data to which a Uniform Resource Identifier (URI) to which the generated random character string is added as a query string is set;

writing the generated NDEF data in the first wireless communicator;

storing the URI including the generated random character string added as the query string;

starting a Common Gateway Interface (CGI) of which a receiving URI is the URI;

determining whether to override the reservation function by determining, when the printing apparatus receives an IPP print request via the second wireless communicator in a state where the reservation function has been set to be executed in the printing apparatus before receipt of the IPP print request, whether a URI of the received IPP print request matches the stored URI including the generated random character string added as the query string;

reserving, in a case where it is determined that the URI of the received IPP print request does not match the stored URI including the generated random character string added as the query string, a print job corresponding to the received IPP print request in the predetermined storage; and overriding the reservation function by starting printing of the print job corresponding to the IPP print request without reserving the print job in the predetermined storage in a case where it is determined that that the URI of the received IPP print request matches the stored URI including the generated random character string added as the query string.

12. A printing apparatus having a reservation function of reserving a received print job in a predetermined storage without starting printing of the received print job until user authentication information is received, comprising:

a first wireless communicator that carries out wireless communication based on near-field communication (NFC);

a second wireless communicator that carries out wireless communication based on a communication method different from that for the first wireless communicator, the printing apparatus being configured to perform a printing process in accordance with an Internet Printing Protocol (IPP) print request received by the second wireless communicator;

a memory; and a processor configured to execute computer executable instructions recorded on the memory, the computer executable instructions including instructions, that when executed by the processor, cause the printing apparatus to:

generate a random character string;

generate NFC Data Exchange Format (NDEF) data to which a Uniform Resource Identifier (URI) to which the generated random character string is added as a query string is set;

write the generated NDEF data in the first wireless communicator;

store the URI including the generated random character string added as the query string;

start a Common Gateway Interface (CGI) of which a receiving URI is the URI;

determine whether to override the reservation function by determining, when the printing apparatus receives an IPP print request via the second wireless communicator in a state where the reservation function has been set to be executed in the printing apparatus before receipt of the IPP print request, whether a URI of the received IPP print request matches the stored URI including the generated random character string added as the query string;

reserve, in a case where it is determined that the URI of the received IPP print request does not match the stored URI including the generated random character string added as the query string, a print job corresponding to the received IPP print request in the predetermined storage; and override the reservation function by starting printing of the print job corresponding to the IPP print request without reserving the print job in the predetermined storage in a case where it is determined that that the URI of the received IPP print request matches the stored URI including the generated random character string added as the query string.

* * * * *